United States Patent
De La Fuente et al.

[11] Patent Number: 5,197,573
[45] Date of Patent: Mar. 30, 1993

[54] ENERGY DISSIPATOR

[75] Inventors: Horacio M. De La Fuente, Boulder, Colo.; Kornel Nagy, Houston; Clarence J. Wesselski, Alvin, both of Tex.

[73] Assignee: The United States of America as represented by the Administrator of the National Aeronautics and Space Administration, Washington, D.C.

[21] Appl. No.: 656,925

[22] Filed: Feb. 15, 1991

[51] Int. Cl.⁵ .................................. F16D 63/00
[52] U.S. Cl. .................. 188/67; 188/82.84; 188/129
[58] Field of Search ............ 188 X/129, 136, 281, 188 X/284, 381, 67, 82.8, 82.84, 82.9; 267/134, 216

[56] References Cited

U.S. PATENT DOCUMENTS

| | | | |
|---|---|---|---|
| 581,136 | 4/1897 | Preece | 188/67 |
| 700,412 | 5/1902 | Fischer | 188/67 |
| 1,370,596 | 3/1921 | Kurtz | 188/129 |
| 2,765,890 | 10/1956 | Pedersen et al. | 188/67 |
| 3,127,788 | 4/1964 | Martens | 74/586 |
| 3,382,955 | 5/1968 | Deyerling | 188/129 |
| 3,820,634 | 6/1974 | Poe | 188/1 C |
| 3,866,724 | 2/1975 | Hollnagel | 188/129 |
| 4,010,940 | 3/1977 | Freyler | 267/9 B |
| 4,291,416 | 9/1981 | Hoeptner, III | 188/67 |
| 4,457,741 | 7/1984 | Hoeptner, III | 474/138 |
| 4,577,732 | 3/1986 | Gottling | 188/67 |
| 4,957,313 | 9/1990 | MacIntyre et al. | 188/67 |

FOREIGN PATENT DOCUMENTS

| | | | |
|---|---|---|---|
| 566844 | 2/1923 | France | 188/196 |
| 903698 | 10/1945 | France | 188/67 |
| 988810 | 6/1949 | France | 188/67 |
| 1101872 | 3/1956 | France | 188/129 |
| 422880 | 9/1974 | U.S.S.R. | 188/67 |

Primary Examiner—Joseph F. Peters, Jr.
Assistant Examiner—Virna Lissi Ansley
Attorney, Agent, or Firm—Edward K. Fein

[57] ABSTRACT

An all metal energy dissipator construction for dissipating kinetic energy force (F) by rolling balls (26) which are forced by a tapered surface (32) on an expandable sleeve (22) to frictionally load a force rod (15). The balls (26) are maintained in an initial position (FIG. 1) by a plate member (48) which is biased by a spring member (50). A spring member (52) returns the force rod (15) to its initial position after a loading force (F) is removed.

6 Claims, 3 Drawing Sheets

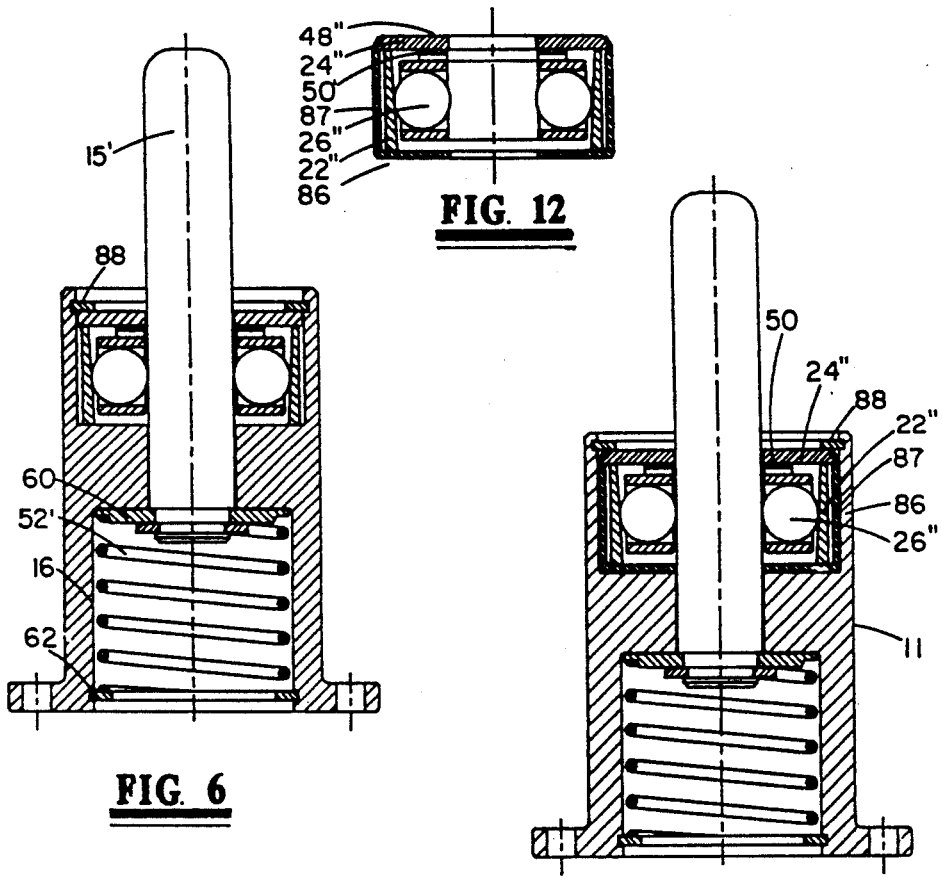
FIG. 12
FIG. 6
FIG. 11
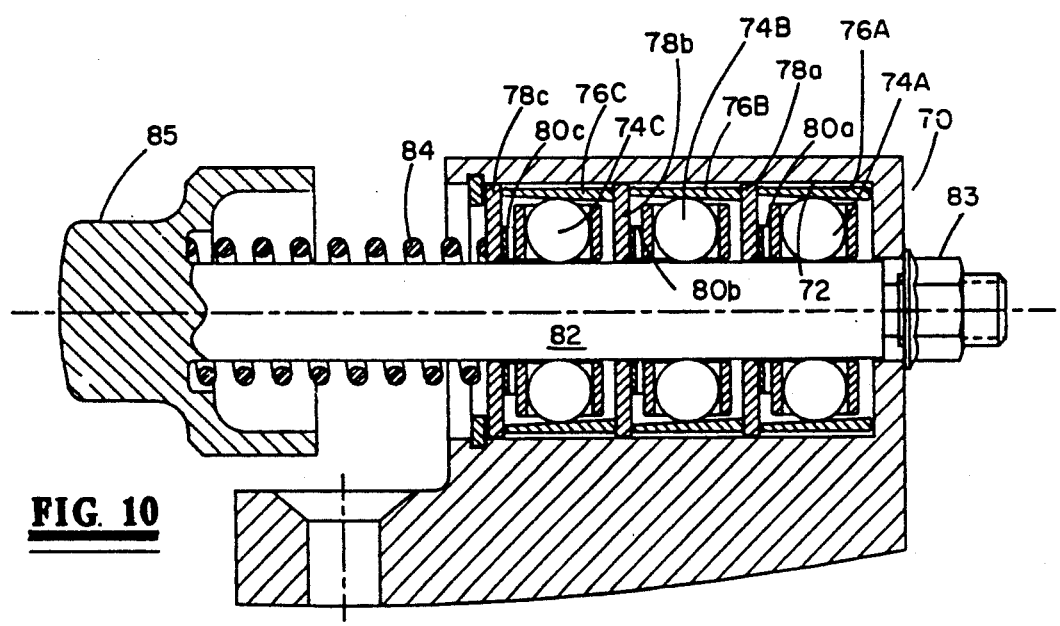
FIG. 10

ENERGY DISSIPATOR

ORIGIN OF THE INVENTION

The invention described herein was made by employees of the United States Government and may be manufactured and used by or for the Government of the United States of America for governmental purposes without the payment of any royalties thereon or therefor.

FIELD OF THE INVENTION

The present invention relates to an energy dissipator, and more particularly to a device for use in rapidly dissipating the energy of a moving mass or load where the device will automatically reset itself after the load is removed and is ready for repeated cycles and which consists of an all metal construction.

BACKGROUND OF THE INVENTION

Energy dissipators principally involve hydraulic shock absorbers which utilize a fluid and thus are subject to fluid leaks which disable the usefulness of the devices or they involve friction washer shock absorbers which are typically nonadjustable without a reconstruction and which cannot be automatically reset.

The present invention concerns itself with an automatically resetable energy dissipator with an all metal construction.

The following represents the available prior art patents.

U.S. Pat. No. 4,457,741 issued to H. W. Hoeptner on Jul 3, 1984. This patent discloses a chain tensioner device which has a configuration somewhat similar in appearance to the present invention but is totally different in function and operation. The Hoeptner device is concerned with forcing a plunger by spring means in a body in one direction to transmit a chain tensioning force to a chain. An automatic locking device prevents retraction of the plunger into the body. The function and purpose of the device is to act as a reverse lock and prevent motion in one direction while permitting spring forced motion in the other direction. The device does not relate to any energy absorbing capability or function. The Hoeptner device uses a steep ramp angle of 15° to 25° which is above the typical locking taper angle in mechanical devices.

U.S. Pat. No. 3,820,634 issued to Lloyd R. Poe on Jun. 28, 1974. Poe discloses a shock resisting device which uses one or more indenting elements which engage and move along an elastomeric member to cause progressive deformation of the elastomer member and attendant energy absorption. It is the deformation of the elastomeric sleeve which provides the energy absorption capability. In the Poe device, a high number of repeated cycles could cause wear to the elastomeric sleeve.

U.S. Pat. No. 4,010,940 issued to A. Freyler on Mar. 8, 1977. This telescopic shock absorber has a number of compressible spheres located between expansion and centering rings as well as a pair of slanting break discs for absorbing shock. The compressible spheres are made of rubber or another plastic material.

U.S. Pat. No. 3,866,724 issued to H. S. Hollnatel on Feb. 18, 1975. This energy absorbing device is a frictional shock absorber which has a non linear relationship between the shock force and resistance to displacements. A resilient actuator member coacts with a wedge member to urge friction pads into engagement with the walls of a housing member. The outward displacement of the friction pads increases as a function of movement of the wedge member.

U.S. Pat. No. 3,127,788 issued to J. E. Martens on Apr. 7, 1964 discloses only a position retaining device which includes a shock absorber.

U.S. Pat. No. 3,382,955 issued to G. P. Deyerling on May 14, 1968. This patent discloses the stroking of the impact rod actuates friction pads which move outwardly so that the pads slide along the inner radius wall of the housing. This device utilizes a tapered cone to increase the frictional forces (now adjustable magnitude) on pads as a function of the stroke. At the end of the stroke, the friction housing is expanded to permit the device to be reset. In another embodiment a bellows device is utilized to generate pressure on tapered surfaces to increase the holding force of friction pads.

None of the foregoing patents illustrate the present invention which provides for a dry or lubricated energy dissipating device. Laboratory tests have indicated that this invention works better lubricated than dry. In addition, none of the previous inventions have a constant load behavior regardless of stroke or shock intensity.

SUMMARY OF THE PRESENT INVENTION

The present invention is embodied in an energy dissipator that utilizes constant sliding friction to dissipate the kinetic energy of a moving mass. The energy dissipator is automatically reset after removal of the load to allow repeated energy absorbing cycles and can be adjusted to absorb different magnitude loads. Energy dissipators according to the present invention may be constructed with nominal load magnitude of a few pounds to thousands of pounds with an adjustable range above and below the nominal setting.

The energy dissipator includes a tubular housing which has a tranverse stop member located in a housing recess. A cylindrical force rod is slidably received in the stop member. The force rod may also be configured with longitudinal grooves to reduce contact stresses. A reset spring member is arranged with respect to the housing and to one end of the force rod to position the force rod in an unactuated condition. The reset spring member serves to reposition the force rod after an energy absorbsion stroke of the force rod. In the housing recess is an internally tapered sleeve member which is disposed adjacent to the stop member. The sleeve member has an outer annular wall surface which is spaced from an inner cylindrical surface of the housing for radial expansion purposes. The sleeve member also has an inner frusto conical or tapered surface for developing a loading force on the force rod. A plurality of balls are disposed in a ball retainer assembly located about the force rod. The balls are located between the force rod and the tapered surface of the sleeve member. The angle of the tapered surface is less than a taper locking angle so that when a moving mass impacts the end of the force rod, the force rod is stroked to compress the spring member and to roll the balls down the tapered surface and toward the stop member. The balls are moved by rotation and move radially inward to develop a frictional load on the force rod which increases until the ball retainer assembly (which contains the balls) reaches the stop member. When the ball retainer assembly reaches the stop member, the force rod continues to slide with respect to the balls with a constant sliding friction force. This constant sliding friction force efficiently dissipates the kinetic energy of the moving mass acting on the force rod.

After the force rod stops moving and the moving mass is removed from the force rod, the reset spring member applies a low load to the force rod in the reverse stroke direction. Because the reverse stroke direction causes the balls to move up the tapered surface and to release the holding force on the force rod, only very little load is needed to reset the force rod to its initial position. The stop member can be adjustably positioned in the housing for accommodating different energy forces. Multiple sets of tapered sleeve members each with sets of balls may be included within the housing to obtain higher force magnitudes with a given size force rod.

DESCRIPTION OF THE DRAWINGS

FIG. 6 is a view in longitudinal cross section through a ball retainer assembly of a modified form of the invention shown in FIG. 1;

FIG. 10 is a view in longitudinal cross section showing a modified form of an energy dissipator with multiple stage ball retainer assemblies;

FIG. 11 is a modified form of that shown in FIG. 6 showing how the ball retainer assembly is installed as a cartridge; and FIG. 12 is the cartridge from FIG. 11.

DESCRIPTION OF THE INVENTION

Figure 1:
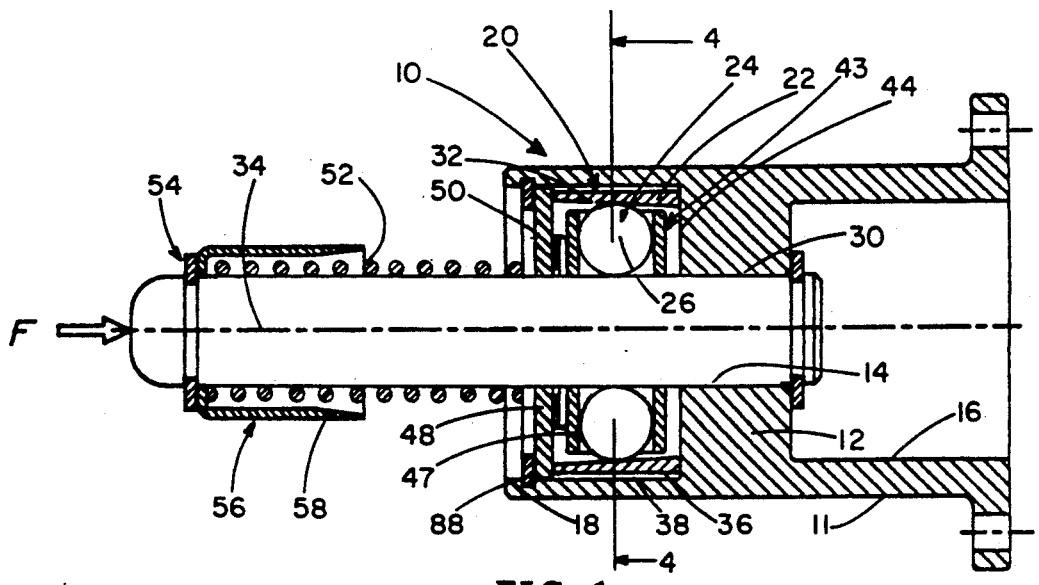
FIG. 1 is an illustration in longitudinal cross section of an energy dissipator in an unenergized position.

As shown in FIG. 1, an energy dissipator 10 includes a tubular housing 11 which is constructed of metal. The housing 11 has a centrally located transverse wall stop section 12 with a bore 14 for slidably receiving an elongated and cylindrically shaped force rod 15. The force rod is made strong enough to handle the force load to be encountered without buckling. On either side of the wall section 12 is a co-axially arranged cylindrical recess 16 and 18. In one of the recesses 18 is a force absorbing assembly 20 which includes an annular tapered sleeve member 22 and an annular frictional ball retainer assembly 24 where the ball retainer assembly 24 is disposed about the force rod 15. The balls 26 in the ball retainer assembly 24 engage the outer surface 30 of the force rod 15 and engage inner wall surface 32 of the sleeve member 22. The inner wall surface 32 is tapered or frusto conical which is at an angle relative to the central axis 34 of the force rod 15. The taper angle is less than the mechanical locking taper angle. The locking taper angle is that angle at which two parts tend to frictionally lock to one another. The outer wall surface 36 of the sleeve member 22 is cylindrical and is spaced from the inner wall of the recess 18 to provide a spacing gap 38. While ball members 26 are preferred, oblate spheroid or similar rolling members may also be used.

Figure 4:
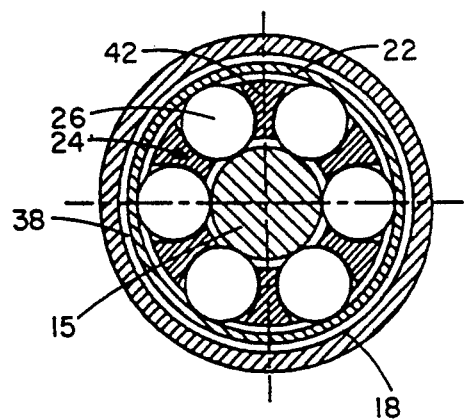
FIG. 4 is a view in cross section taken along line 4—4 of FIG. 1.

The ball retainer assembly 24 includes a retainer housing 42 (see FIG. 4) which holds six balls 26 at an angular relationship of 60° relative to one another in ball sockets. An inner end surface 43 of the retainer housing 42 is spaced from a facing stop surface 44 on the wall section 12. (See FIG. 1). Between the upper surface 47 of the retainer housing 42 and an annular cap member 48 is a wavy spring washer 50 to resiliently bias the ball retainer assembly 24 toward the facing stop surface 44. A retainer ring 88 serves to hold all the various parts in the housing 11. A compression spring member 52 is disposed between the cap member 48 and an end location 54 of the force rod 15. An inverted cup member 56 is attached at the end location 54 to the force rod 15 and has a downwardly extending sleeve 58 which serves to contain the spring 52 when it is fully compressed (see FIG. 2).

Figure 3:
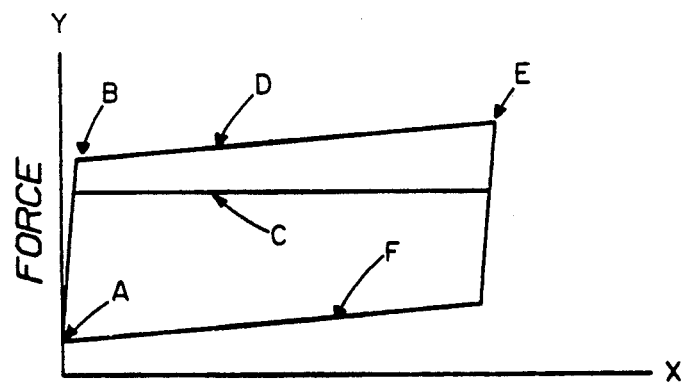
FIG. 3 is a force/stroke diagram.
Figure 2:
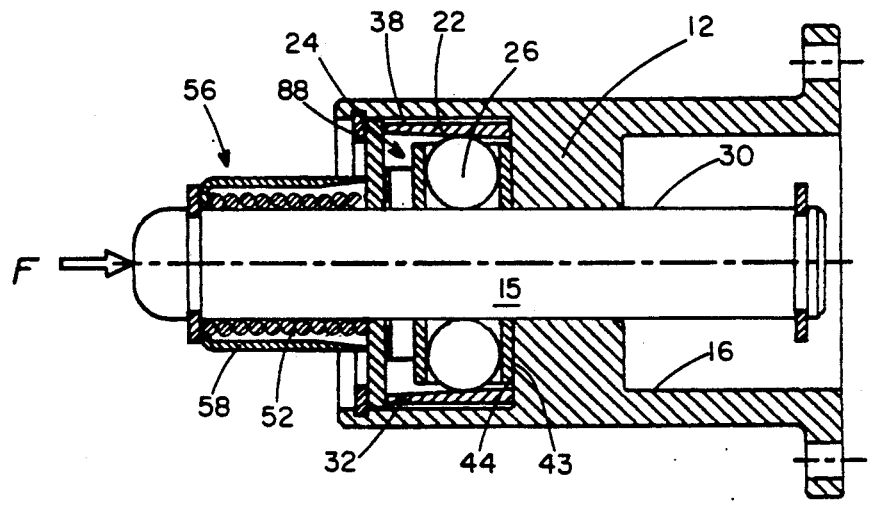
FIG. 2 is a view in longitudinally cross section showing the energy dissipator of the present invention in a fully energized position and prior to a reset.

Referring now to FIG. 3, an ideal force vs. stroke relationship is illustrated with the stroke of a force rod 15 being illustrated on an X axis and the force or magnitude of force being illustrated on a Y axis. When a moving mass first impacts the end of the force rod 15 with a force F causing the force rod 15 to stroke and to compress the spring 52, as shown in FIG. 2, the stroke of the force rod 15 causes the balls 26 to rotate in the ball retainer assembly 24 because of friction with the force rod 15 and the wall surface 32 so that the inner end surface 43 of the retainer assembly 24 moves to contact the facing stop surface 44. (See FIG. 2). The decreasing annular space between the tapered wall surface 32 and the outer surface 30 of the force rod 15 causes the balls 26 to apply force between the outer surface of the rod 15 and the wall surface 32 of the sleeve member 22. This force can expand the sleeve member 22 in the spacing gap 38. As the force on the force rod 15 increases (see FIG. 3) from an initial force/stroke location A (see FIG. 3) to a force/stroke location B where the inner end surface 43 of the ball retainer assembly 24 reaches the facing stop surface 44 of the stop section 12. After the ball retainer assembly 24 reaches the stop section 12, the force rod 15 continues to move with frictional contact with respect to the balls 26 and with a constant sliding friction force while compressing the spring 52. The constant friction force is shown by the curve C in FIG. 3 while the curve D shows the sum of constant friction force and the compression force on the return spring 52. This constant sliding friction force and the spring compression dissipates the kinetic energy of the moving mass. The cup member 56 serves to retain the spring 52 in alignment with the force rod 15. The lower end of the force rod 15 is retained within the recess 16.

When the movement of the mass is dissipated and the force on the force rod 15 is released (Point E)(See FIG. 3), the reset spring 52 applies a low load force to the end of the force rod 15 in the reverse stroke direction (curve F, FIG. 3). The reverse stroke movement of the force rod 15 causes the balls 26 to move the ball retainer assembly 24 away from the facing stop surface 44 and to release the frictional forces on the force rod 15. Only a very little load is needed to reset the force rod 15 to its initial position.

Figure 5:
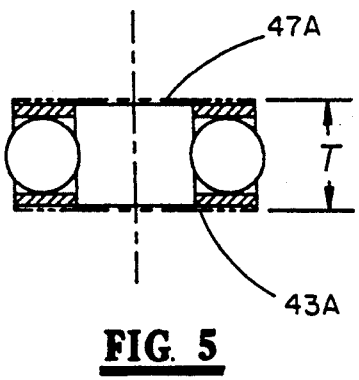
FIG. 5 is a cross section view of a ball retainer assembly prior to re-shaping.

The relationship for establishing the load level for an energy absorber unit can be accomplished during construction by making an oversized or thicker retainer housing 42 with an initial thickness T (See FIG. 5). The unit is assembled and a load force is then applied to the force rod 15 to determine if the inner end surface 43 bottoms out on the stop surface 44 and the force stroke relationship as shown by FIG. 3 is obtained. To obtain this relationship, the top and bottom surfaces 47A, 43A (FIG. 4) of the retainer housing 42 are shaved so that the thickness of the retainer housing 42 is reduced as necessary by cut and try to reach the desired load level. As the thickness of the retainer decreases, the load level increases.

In FIG. 6 another form of the invention is illustrated wherein the spring 52' is disposed within the cylindrical recess 16 between a stop plate 60 on the force rod 15' and a retainer ring 62 in the recess 16. This relocation of the spring member eliminates the need for a protective cover for the spring member.

Figure 7:
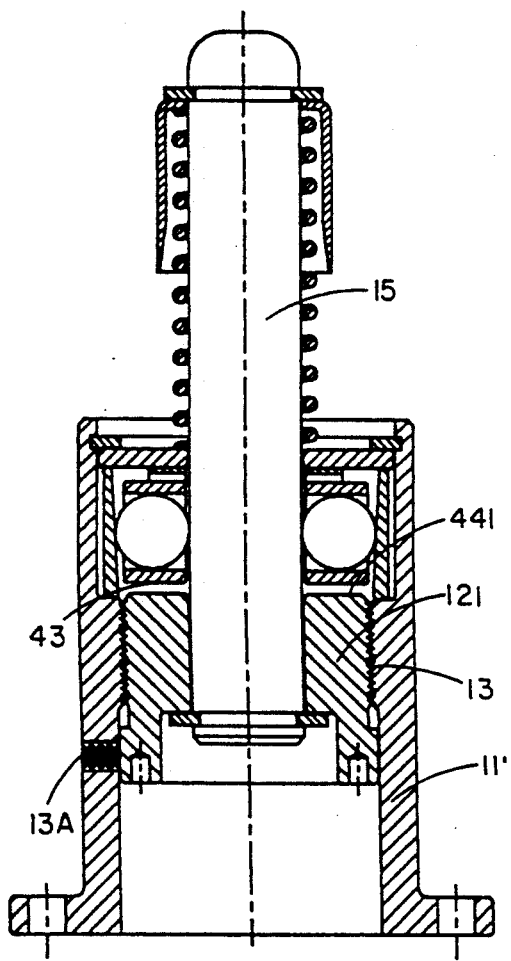
FIG. 7 is a view in longitudinal cross section through a ball retainer assembly of a modified form of the invention shown in FIG. 1.

In FIG. 7 another form of the invention is illustrated wherein the center stop section is an externally thread member or plug 12' disposed in a threaded section 13 of the housing 11'. A spanner wrench can be applied to the plug 12' to adjust the spacing between the retainer inner end surface 43 and the facing stop surface 44' on the plug 12'. A locking means 13A keeps the plug 12' from rotating after adjustment.

Figure 8:
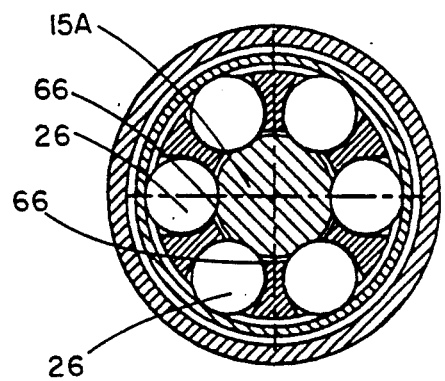
FIG. 8 and FIG. 9, respectively, are views in transverse cross section through a retainer ball assembly respectively showing different forms of force rod configurations.

In FIG. 8, another form of the invention is illustrated where the force rod 15A is provided with longitudinally extending grooves 66 with a curvature similar to the curvature of the balls 26. This provides for greater contact surface.

Figure 9:
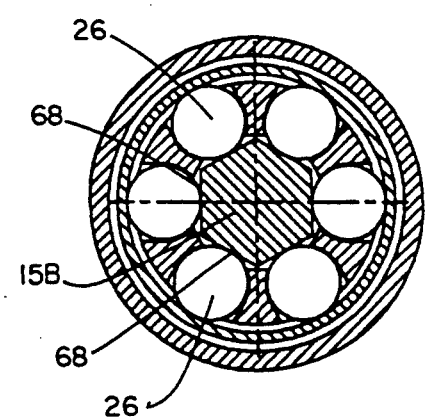

In FIG. 9, another form of the invention is illustrated where the force rod 15B is provided with a hexagonal cross section where surfaces 68 contact balls 26 and prevent rotation of the force rod 15B relative to the housing.

In FIG. 10, a multistage configuration is illustrated. By using multiple ball retainer assemblies instead of one assembly, the size of the energy dissipator can be considerably reduced. As shown in FIG. 10, the housing 70 has a cylindrical recess 72 which contains three ball retainer assemblies 74A, 74B and 74C, and three annular sleeves, 76A, 76B and 76C. A separator plate 78A, 78B and 78C and spring members 80A, 80B and 80C act on each retainer assembly. The configuration of each retainer assembly is the same. The force rod 82 has a stop nut 83 at one end and a force cup 85 at the other end. A compression spring 84 on the force rod 82 is disposed between the separator plate 78C and the force cup 85. When a force is applied to the force cup 85 while the housing 70 is stationary, each of the stages or ball retainer assemblies equally or nearly equally absorbs the frictional forces generated.

As an example of its compactness of the system of FIG. 10, the housing 70 is less than two inches long, less than one inch in diameter and with a force rod about 3/16 of an inch in diameter. The force rod 82 can be made from corrosion resistant steel 455, AMS 5617 and nitrided to provide very hard hardness. The taper rings 76A, 76B, 76C can be made of material MP 35N, AMS 5844 and heat treated at 1025° F. for four hours followed by air cooling. The housing 70 can be made of corrosion resistance material 15-5, AMS 5659. With this design, the stroke of the force rod 82 is about ¼ inches for a stroke load of 225 pounds.

Another form of the invention is shown in FIGS. 11 and 12. Instead of assembling individual parts into the housing 11, it may be more advantageous in some applications to assemble the energy absorbing element 86 shown in FIG. 12 as a prepackaged cartridge into the housing 11 and retained by retainer ring 88. The cartridge 86 consists of the ball retainer 24", balls 26", tapered sleeve member 22", wavy spring 50", cup 87, and a cap member 48" retained by the swaging of the end of cap member 48".

It will be apparent to those skilled in the art that various changes may be made in the invention without departing from the spirit and scope thereof and therefore the invention is not limited by that which is enclosed in the drawings and specifications, but only as indicated in the appended claims.

We claim:

1. An energy dissipator system for absorbing kinetic energy between relatively movable elements at a constant rate, said energy dissipator system including:
   a hollow support housing;
   an energy rod member, said rod member being slidably disposed in said support housing and defining an annular recess with said support housing;
   said rod member and said support housing being relatively displaceable and adapted for independent connection to external relatively moveable elements;
   energy dissipator means disposed in said annular recess and including an elastically expandable sleeve member having an internal frusto conical tapered surface disposed at an angle relative to the outer surface of said rod member which angle is less than a locking taper angle and including rolling members disposed in contacting relationship between the outer surface of said rod member and said tapered surface; and
   a stop portion disposed in said housing providing means for limiting travel of said rolling members upon movement of said rod member relative to said tapered surface in a first direction of relative movement said stop portion being adjustable relative to said housing for changing the spacing between said rolling members and said stop portion for developing a constant sliding friction force on said rod member during such relative movement.

2. The energy dissipator system as set forth in claim 1 wherein said rolling members are maintained in contact with said tapered surface and said rod member by resilient means.

3. The energy dissipator system as set forth in claim 1 wherein resilient means are disposed between the end of said rod member and said support housing for providing a low load return force on said rod member after a kinetic load has been absorbed.

4. The energy dissipator system as set forth in claim 1 wherein said sleeve member is spaced inwardly from an inner wall of said support housing for providing an expansion gap for said sleeve member.

5. The energy dissipator system as set forth in claim 1 wherein said energy dissipator means includes a hollow housing member with a cover member for independently enclosing said sleeve member and said rolling members where said hollow housing member is disposed in said annular chamber.

6. The energy dissipator system as set forth in claim 5 and further including resilient means located between said rolling members and said cover member for resiliently biasing said roller members into contact with said tapered surface.

* * * * *